United States Patent
Yon et al.

(10) Patent No.: US 6,507,824 B1
(45) Date of Patent: Jan. 14, 2003

(54) METHOD AND SYSTEM FOR SELECTING PRODUCT COLORS

(75) Inventors: Dennis Yon, Slingerlands, NY (US); Edward Tucker, Slingerlands, NY (US); Mark Hindal, Pittsfield, MA (US); Clarence Nunn, East Greenbush, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/451,455

(22) Filed: Nov. 30, 1999

(51) Int. Cl.$^7$ .............................................. G60F 17/60
(52) U.S. Cl. ...................................................... 705/26
(58) Field of Search .......................................... 705/26

(56) References Cited

U.S. PATENT DOCUMENTS

| | | | |
|---|---|---|---|
| 3,750,683 A | * 8/1973 | Desell | 132/55 |
| 4,931,929 A | 6/1990 | Sherman | |
| 5,249,263 A | 9/1993 | Yanker | |
| 5,692,071 A | 11/1997 | Govaert | |
| 5,724,443 A | 3/1998 | Nishikawa | |
| 5,822,428 A | * 10/1998 | Gardner | 380/4 |
| 5,841,421 A | 11/1998 | Cheetam et al. | |
| 5,872,555 A | * 2/1999 | Kolar et al. | 345/150 |
| 5,949,904 A | * 9/1999 | Delp | 382/165 |
| 6,011,540 A | 1/2000 | Berlin et al. | |
| 6,014,221 A | 1/2000 | Plude, Jr. | |
| 6,065,969 A | * 5/2000 | Rifkin et al. | 434/100 |

FOREIGN PATENT DOCUMENTS

KR    2001107395 A    * 12/2001

OTHER PUBLICATIONS

Halo Wiglet Brochure, undated.*
National Enquirer advertisement, undated.*

* cited by examiner

*Primary Examiner*—Kenneth R. Rice (57) ABSTRACT

An exemplary embodiment of the invention is a method for allowing a potential purchaser to specify a custom color to a vendor. The method is implemented through a potential purchaser computer coupled to a vendor host computer system by a network. The method includes receiving at the vendor host computer system a request to specify a custom color from the potential purchaser computer. The potential purchaser computer is provided with a custom color request form. The vendor host computer system receives a custom color specification from the potential purchaser computer which is based on entries in the custom color request form. An alternate embodiment of the invention is a method for selecting a color from a vendor color database in response to a standard color. The method is implemented through a potential purchaser computer coupled to a vendor host computer system by a network. The method includes receiving at the vendor host computer system a standard color from the potential purchaser computer. The vendor host computer retrieves at least one color from the vendor color database close to the standard color. The at least one vendor color close to the standard color is presented to the potential purchaser computer.

10 Claims, 6 Drawing Sheets

| SEARCH | BROWSE | OPTIONS | ORDER |

ITEM INFORMATION:
GE IDENTIFICATION: #55202
PRODUCT: CYCOLAC

[DELETE FROM ORDER]

[PLACE ORDER] — 49

ORDER LIST:
5 ITEMS

| GE 04997 |
| GE 57712 |
| GE 54951 |
| GE 57235 |
| GE 66202 |

52

SHIPPING ADDRESS:

NAME:              JOE SMITH
POSITION:          DESIGNER
DIVISION:          US
COMPANY:           JSD
SHIPPING ADDRESS:  123 MAIN ST
CITY:              BIG CITY
STATE/PROVINCE:    NEW STATE
POSTAL CODE:       7664
COUNTRY:           US

[CHANGE ADDRESS]

NOTE:
CHANGING YOUR ADDRESS WILL
RESULT IN A 24 HOUR SHIPPING
DELAY DUE TO ADDRESS
VERIFICATION.

METHOD AND SYSTEM FOR SELECTING PRODUCT COLORS

BACKGROUND OF THE INVENTION

The present invention relates to color and, more specifically, to the selection of a color for a product.

Many products are offered in a number of colors. For instance, paints and plastics are offered in numerous colors. Potential purchasers of products that come in a number of different colors are either: (1) looking for the product in a specific color; or (2) want to browse the available colors for the product. Presently, a potential purchaser that is looking for a product in a specific color has three options for determining whether the product is available in the desired color. The first option requires the potential purchaser to send a sample of the desired color to the vendor. The vendor then performs a search of its color library to determine whether or not the product is available in the desired color and then informs the potential purchaser of the results of the search. The second option is for the potential purchaser to travel to the vendor's site and review their color library for a product to determine whether or not the vendor offers the product in the desired color. Lastly, the potential purchaser can request a physical copy of the vendor's color catalog for the product and search the catalog for the specific color. Due to printing costs and the like, physical copies of the vendor's catalog are, in many instances, out of date. In any case, the vendor may offer the product in a color that, while not the desired color, is close enough. Alternatively, if the product is not available in the desired color or a color that is close enough for the purchaser, some vendors offer to match the color. Matching a color is generally a time consuming and expensive endeavor. A purchaser that wants to browse the available colors for a product either travels to the vendor's site to peruse the vendor's color library for a product or obtains a copy of the vendor's color catalog for the product to review.

BRIEF SUMMARY OF THE INVENTION

An exemplary embodiment of the invention is a method for allowing a potential purchaser to specify a custom color to a vendor. The method is implemented through a potential purchaser computer coupled to a vendor host computer system by a network. The method includes receiving at the vendor host computer system a request to specify a custom color from the potential purchaser computer. The potential purchaser computer is provided with a custom color request form. The vendor host computer system receives a custom color specification from the potential purchaser computer which is based on entries in the custom color request form.

An alternate embodiment of the invention is a method for selecting a color from a vendor color database in response to a standard color. The method is implemented through a potential purchaser computer coupled to a vendor host computer system by a network. The method includes receiving at the vendor host computer system a standard color from the potential purchaser computer. The vendor host computer retrieves at least one color from the vendor color database close to the standard color. The at least one vendor color close to the standard color is presented to the potential purchaser computer.

DETAILED DESCRIPTION OF THE INVENTION

Figure 1:
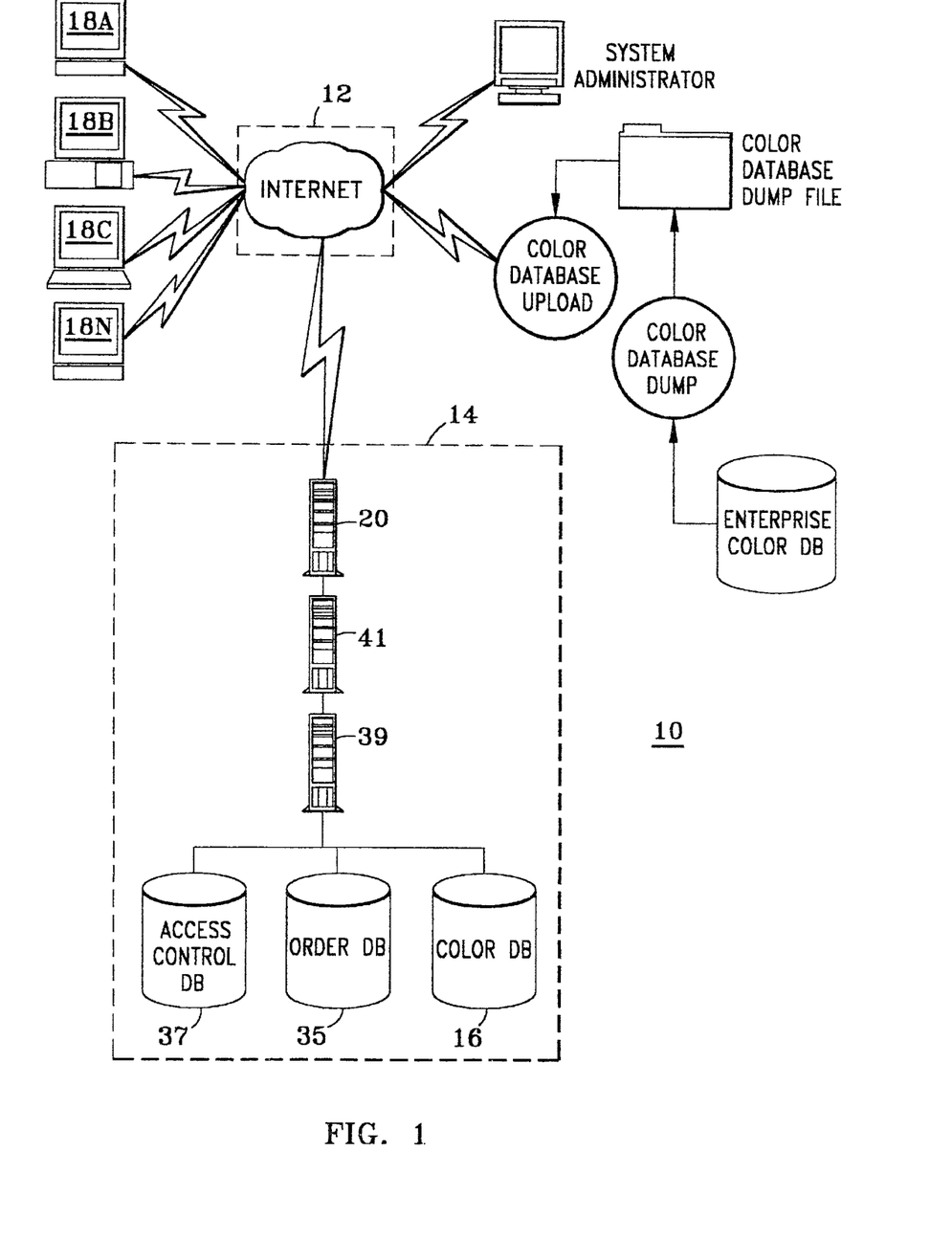
FIG. 1 is a diagram of a system capable of communicating information relating to the available colors for a product to a potential purchaser.

FIG. 1 illustrates a system 10 for providing color related information on a product to a potential purchaser of the product. The system 10 includes: (1) a digital communication network 12 for conveying digital information between at least two locations; (2) a host computer system 14 that includes a color database 16 for a product and is capable of providing color related information for transmission over the network 12; and (3) one or more potential purchaser computers 18A–18N that are each capable of generating requests relating to a color database for transmission over the network 12 and receiving replies from the host computer system 14 that have also been transmitted over the network 12.

In FIG. 1, the network 12 may be the Internet and, more specifically, the World Wide Web portion of the Internet. Due to the use of the World Wide Web as the network 12, the potential purchaser computers 18A–18N and the host computer system 14 are each capable of communicating over the Web. In this regard, the potential purchaser computers 18A–18N are each devices that are capable of running a Web browser to communicate over the Web. For example, a potential purchaser's computer can be a personal computer or a Web TV. The host computer system 14 utilizes a Web server 20 to communicate with the potential customer computers 18A–18N. Even though the system 10 utilizes the Web as the network 12 for conveying communications between the host computer system 14 and the potential purchaser computers 18A–18N, it should be appreciated that the invention is capable of being adapted for use in other types of systems.

The host computer system 14 provides each of the potential purchaser computers with an interface that permits the potential purchaser to interact with the host computer system 14 via their computer. The interface includes an output portion and an input portion. The output portion conveys information from the host computer system 14 to a potential purchaser's computer and is typically displayed on the color monitor of the potential purchaser's computer. However, the output portion could be displayed on any output peripheral that is capable of generating colors. The input portion of the interface is used to convey information from the potential purchaser's computer to the host computer system 14.

Typically, the input information is generated by the potential purchaser's use of an input peripheral, such as a mouse or keyboard. In the illustrated embodiment, the interface is provided by Web pages that are transmitted from the host computer system 14 to a potential purchaser's computer. The Web pages display output information to the potential purchaser. In most cases, a portion of the display is used to solicit information from the potential purchaser by manipulating an input peripheral. For example, the potential purchaser may use their keyboard to input information into a field in the display or their mouse to click on a portion of the display, and thereby provide the host computer system 14 with information.

The interface provided to the potential purchaser's computer relates to either a search mode or a browse mode of operation. The search mode of operation permits a potential purchaser that knows the color that they desire for a particular product to determine if the vendor either has the product in the target color or a color that is close enough to the target color. The browse mode of operation permits a potential purchaser who is uncertain of what color they want for a particular product to browse the available colors for the product.

Figure 2:
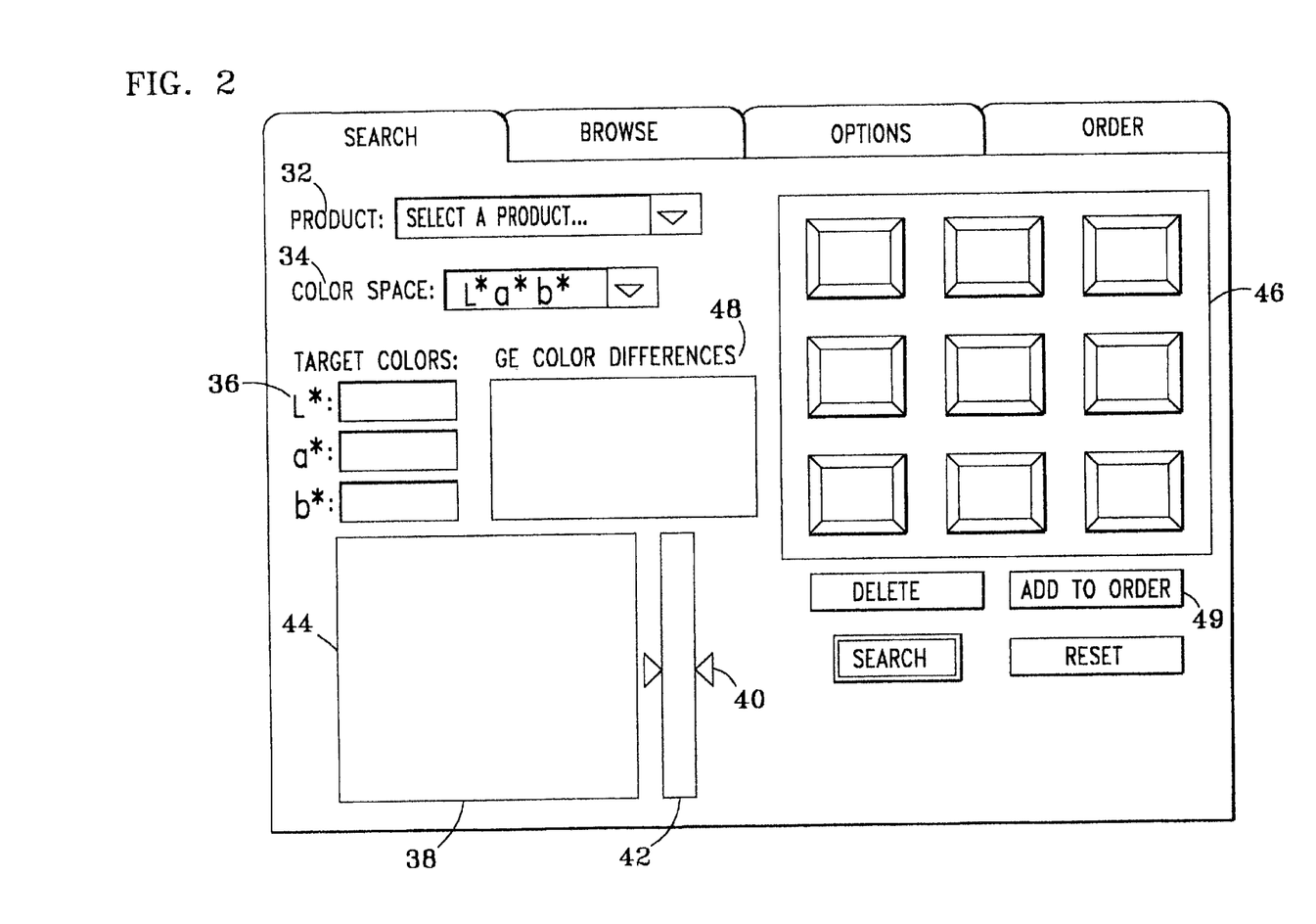
FIG. 2 shows one possible interface display on a potential purchaser's color monitor for permitting the potential purchaser to input a target color description to be used in the search mode of operation.

Regardless of the mode of operation, in many cases the vendor offers more than one product and each product is available in more than one color. For instance, a plastics vendor, could offer polycarbonate, ABS and polypropylene plastics, with each being available in a number of different colors. Consequently, in this case, the interface provided by the host computer system 14 to the potential purchaser's computer requires the potential customer to initially identify the product in which they are interested so that the host computer system 14 can access the appropriate color database. FIG. 2 illustrates one possible Web page that could be displayed on the monitor of a potential purchaser's computer and used by the potential purchaser to select the product of interest. The Web page includes a menu of products field 32 that permits the potential purchaser to select the product of interest. Typically, the potential purchaser uses a mouse to make the selection. However, it is also feasible to use other input devices to make a selection. In any event, once the selection has been made, the product selection information is conveyed over the network 12 to the host computer system 14.

In the search mode of operation, the potential purchaser specifies a target color for the product. The target color can be specified in a number of different ways. One way is the RGB method, which involves specifying a value for the red, green and blue components of the target color. Presently, values from 0–256 can be specified for each component. Another way to specify a color is by the L*a*b* method. In this case, values are specified for the "L*", "a*" and "b*" components of the target color. The "L*" component is the lightness/darkness of the target color; the "a*" component relates to the red/green aspect of the target color; and the "b*" component relates to the yellow/blue aspect of the target color. Presently, the "L*" component can have a value from 0 to 10, the "a*" component can have a value from −199 to +199; and the "b*" component can have a value from −199 to +199. Yet another way to specify a color is for the purchaser to select a color from a color display, either one or two dimensional, comprised of a number of color swatches. Associated with each tile is either a RGB or L*a*b* code.

To specify the target color, the potential purchaser's computer is provided with an interface that permits the potential purchaser to identify the target color. In the illustrated embodiment, the interface is a Web page that is provided by the host computer, conveyed over the network 12 and displayed on the monitor or other output device of the potential purchaser's computer. FIG. 2 illustrates one possible Web page that could be displayed on the monitor of a potential purchaser's computer and used by the potential purchaser to input target color information to the host computer system 14. The potential purchaser is permitted to specify which color definition (RGB, L*a*b* or color display) is to be used in color space field 34. If either RGB or L*a*b* color definition scheme is selected, the potential purchaser specifies the value for each component of the target color in the target color values field 36. If the potential purchaser selects the color display, the target color is selected from a color display 38. To elaborate, the potential purchaser positions a bar 40 within a lightness field 42 to define the brightness of the target color. The user inputs or selects the hue of the target color from the color palette field 44 using a mouse or other appropriate input device. The potential purchaser may also change only the products field 32 after specifying a target color to view other products having similar target colors. In any event, once the brightness and hue of the target color have been specified, the target color information is conveyed over the network 12 to the host computer system 14.

Once the host computer system 14 has received the target color information, a search of the color database 16 of available colors for the product commences. To facilitate the search of the database of available colors for a product, the search is conducted according to a single color identification system. In this case, the search initially may involve converting the target color data from one color identification system into the color identification system used in performing the search. In the illustrated embodiment, the search is conducted based on the L*a*b* system. Consequently, if the target color is specified according to the RGB system, it is converted to the L*a*b* system. This conversion is done according to a well known formula used in the television industry. After any conversion, the host computer system 14 operates to determine the "n" number of available colors for the product that are closest to the target color. In the illustrated embodiment, the number "n" is nine. However, this number can be changed if desired.

The determination of the "n" closest available colors is done by associating a tolerance with each of the values of the target color. For instance, the tolerance may be ±10 units. In essence, this defines a three dimensional space of color values. A search is then conducted of the database of available colors for the product for all the available colors that fall within the defined space. If the search identifies a number of available colors that exceeds the "n" value, the tolerance is halved to define a smaller three-dimensional space and the search is repeated. If a search identifies a number of available colors that is less than the "n" value, the tolerance is doubled to define a larger three-dimensional space and the search is repeated. Typically, the number "n" will be greater than the numbers of available colors identified in a search having first tolerance and less than the number of available colors identified in a search having a second tolerance that is twice the first tolerance, i.e. the next higher tolerance level. In this case, the "n" closest available colors from the search that produced "n" or more available colors are provided to the potential purchaser. While the search is shown as being conducted using the L*a*b* format, the search is capable of being adapted to the RGB format or any other multidimensional format for defining a color.

For each of the available colors that the host computer system 14 identifies as being closest to the target color, the host computer system 14 also determines the "closeness" of the available color to the target color. In the illustrated embodiment, the closeness (e) of an available color to the target color is determined by: (1) determining the differences (dL*, da* and db*) between the "L*", "a*" and "b*" components of the available color and the corresponding "L*", "a*" and "b*" components of the target color; (2) squaring the differences; and (3) summing the squares; and (4) taking the square root of the sums. This method of determining "closeness" is adaptable to the RGB format and any other multidimensional format for defining a color.

Figure 3:
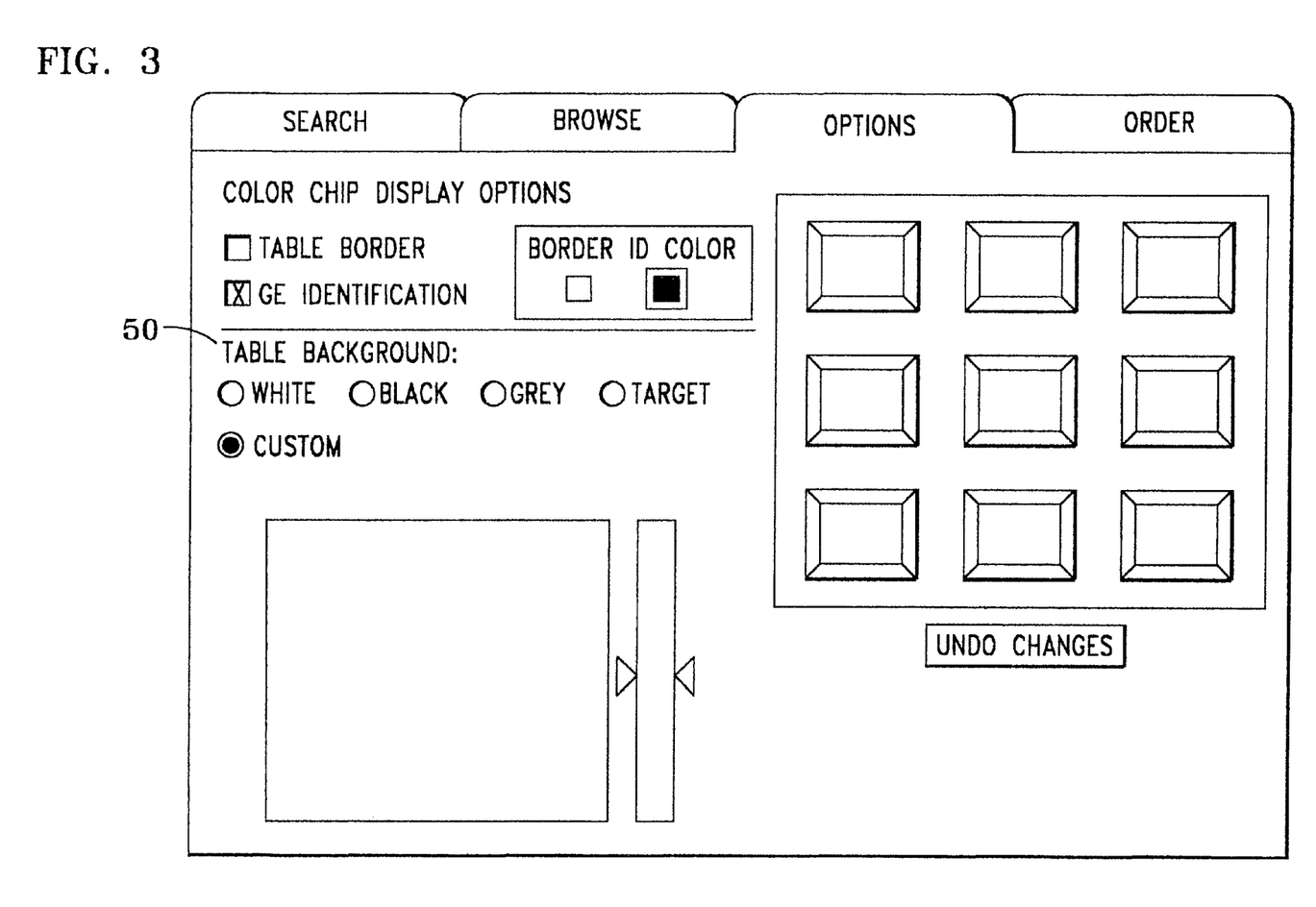
FIG. 3 shows one possible display on a potential purchaser's color monitor of an options menu that permits the potential purchaser to configure the viewing options, such as selecting the background color to be used in the "virtual color table" shown in FIG. 2.

Once the host computer system 14 has identified the available colors that are closest to the target color and the closeness of each of each of the available colors to the target color, this information is conveyed over the network 12 to the potential purchaser's computer for display on the color monitor or other output device associated with the potential purchaser's computer. Typically, the information is conveyed in RGB format, which is color format used by most computers. In the illustrated embodiment, the information is conveyed in the form of a Web page that is displayed on the color monitor of the potential purchaser's computer that is running a browser. The information is displayed as a "virtual color table" in which the default background color is the target color and the "n" closest available colors are swatches or tiles overlying the background color. The interface permits the potential purchaser to move or "drag" swatches around on the virtual color table. FIG. 2 includes an example of a virtual color table 46. Associated with each swatch in the virtual color table 46 is the closeness value calculated by the host computer. In FIG. 2, the closeness of a particular swatch to the target color is displayed in closeness field 48. The potential purchaser uses their mouse or other input device to pick the swatch in the virtual color table 46 for which they want a closeness value to be displayed in the field 48. Further, if needed, a vendor identification number can also be associated with each swatch. The interface also permits the potential purchaser to define a different background color. FIG. 3 illustrates an options Web page that permits the potential purchaser to define the background in a table background field 50.

Figure 4:
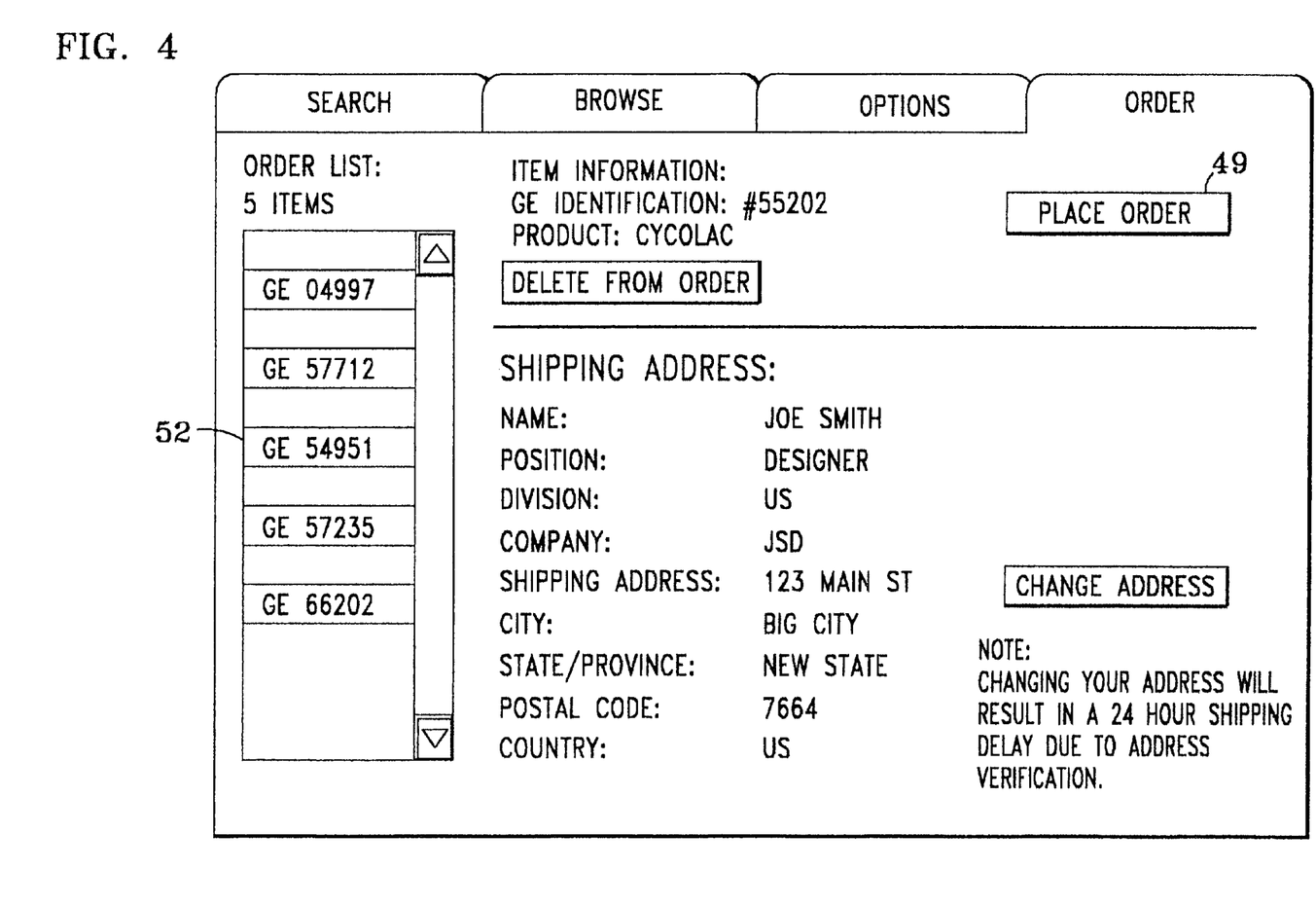
FIG. 4 shows one possible display on a potential purchaser's color monitor of a form for ordering samples of colors of a product.

At this point, the interface permits the potential purchaser to identify one or more of the available colors identified in the search as colors for which the potential purchaser would like actual samples to inspect. In the illustrated system, the potential purchaser uses a mouse or other input device to identify or "click on" the available color for which samples are desired. The color is typically identified by its vendor number. However, it is feasible to use a RGB, L*a*b* or other color identification number as the vendor number or translate such a number into a vendor number. In any event, this information is conveyed over the network 12 to the host computer system 14. In response, the host computer system 14 communicates the sample order to the appropriate individuals for processing. FIG. 4 illustrates an order Web page that permits the potential purchaser to order actual samples of the colors in an order list field 52. The colors in the order list field 52 are defined by using a mouse or other input device to: (1) identify a particular color in the virtual color table 46; and (2) then actuate an add to order button 49. As an alternative, or in addition to ordering samples, the interface permits the potential purchaser to also place an order for a quantity of product in an available color that either matches the target color or, based upon the potential purchaser's judgment, is close enough to the desired color.

The potential purchaser may also order samples of colors based on the vendor identification number instead of searching or browsing through the database. This is useful for ordering transparent or translucent color samples which are difficult to evaluate on the potential purchaser's computer display.

The browse mode of operation permits a potential purchaser who is uncertain about the color that they want for a particular product to peruse the available colors for the product. If there are only a few available colors for a product, a one dimensional array of the available colors is conveyed from the host computer system 14 to the potential purchasers computer system over the network 12. The array is displayed on the potential purchaser's color monitor or other output device. In many cases, the number of available colors for a particular product is greater than can be meaningfully displayed in a single image on the potential purchaser's color monitor or other output device. In this situation, the potential purchaser is provided with an interface that includes an indexing tool. The indexing tool is a spectrum of colors that is transmitted from the host computer system 14 to the potential purchasers computer system for display on a color monitor. The potential purchaser is able to move a bar or other indicator within the spectrum by manipulating an input device, typically a mouse. The location of the bar relative to the displayed spectrum is conveyed over the network 12 to the host computer system 14. The location of the bar defines a color definition, such as a RGB or L*a*b* color definition. In response, the host computer system 14 determines which of the available colors are within a certain tolerance of the defined color, much like the previously described search operation, and transmits swatches of the available colors over the network 12 to the potential purchaser's computer for display on a color monitor or other output device.

Figure 5:
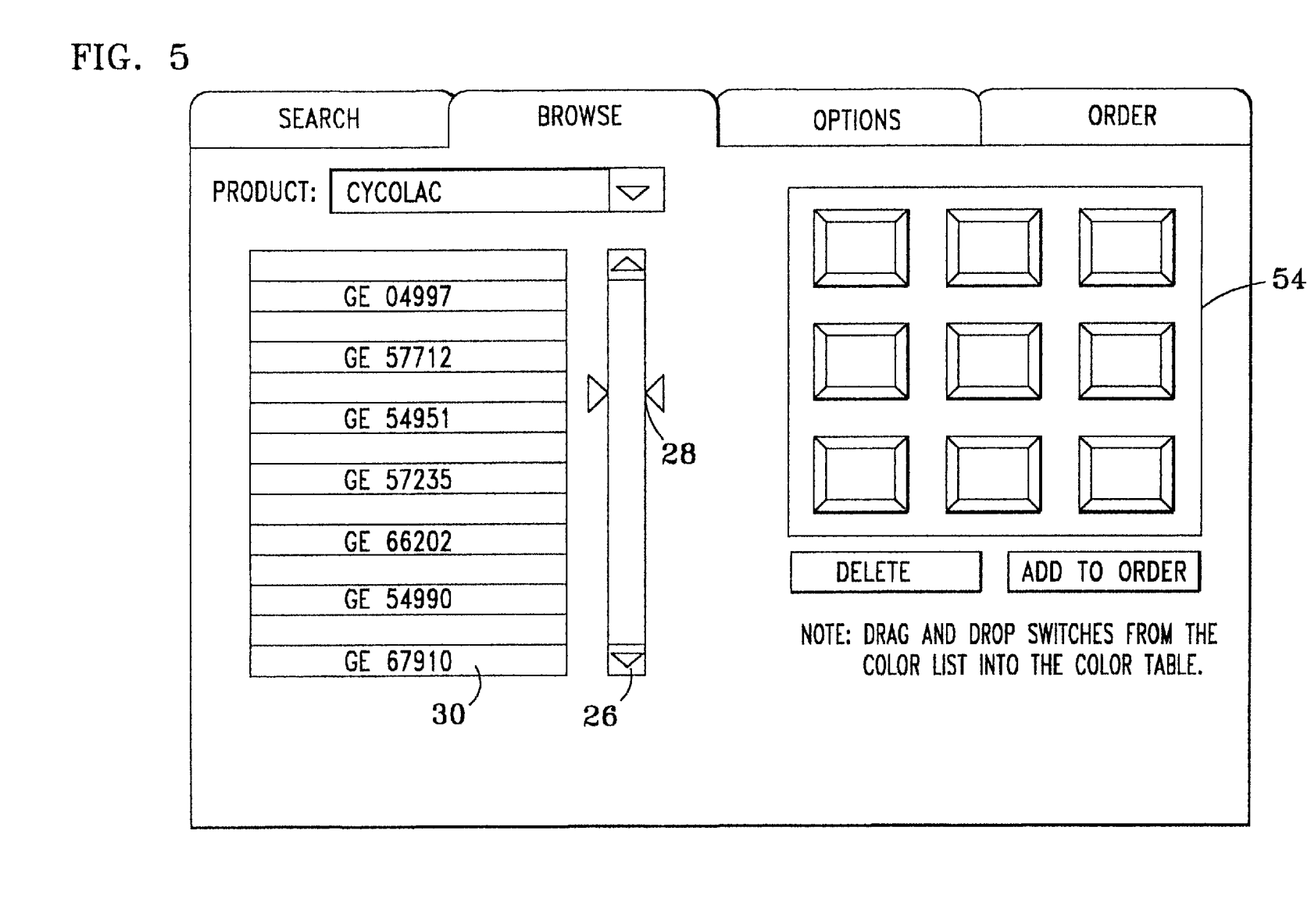
FIG. 5 shows one possible interface display on a potential purchaser's color monitor for permitting the potential purchaser to browse a color database for a product.

FIG. 5 illustrates one possible Web page that could be displayed on the potential purchaser's computer in a browse mode. The spectrum is one dimensional array and is displayed in a window 26 on the potential purchaser's color monitor. A bar 28 is located adjacent to the window 26 and can be moved back and forth along the length of the spectrum. The available colors for the product that are closest to the color in the spectrum indexed by the bar 28 are displayed in a one dimensional array in another window 30 on the potential purchaser's color monitor. Colors that are selected from the window 30 are displayed in a virtual color table 54 that is identical to the virtual color table 46 shown in FIG. 2. The Web page interface operates such that as the potential purchaser changes the position of the bar 28 relative to the spectrum in the first window 26, the host computer system 14 changes the available colors in the second window 30. Further, if a search was conducted before the browse mode was entered, the browse mode initially positions the bar at a point on the spectrum that roughly corresponds to the target color defined in the prior search mode.

At this point, the potential purchaser can select one or more of the colors from the virtual color table 54 as colors for which they would like to obtain actual samples to inspect. The ordering of samples proceeds in substantially the same manner as described with respect to the search mode.

The host computer system 14, in the illustrated embodiment, includes an order database 35, access control database 37, database server 39 and firewall 41. The database server processes requests relating to either the color database 16, order database 35 or access control database 37.

The order database 35 is used to store sample orders made by a potential purchaser and/or product orders. The access control database 37 operates in conjunction with the firewall 41 to: (1) prevent unauthorized access to the host computer system 14; and (2) with respect to individuals/companies that are authorized access to the host computer system 14, enforce any limitations on the authorized access. For instance, a system administrator typically may have access to the entire system. Whereas, a potential purchaser would have their access limited to reading information from the color database 16 and placing orders for either samples or product.

Figure 6:
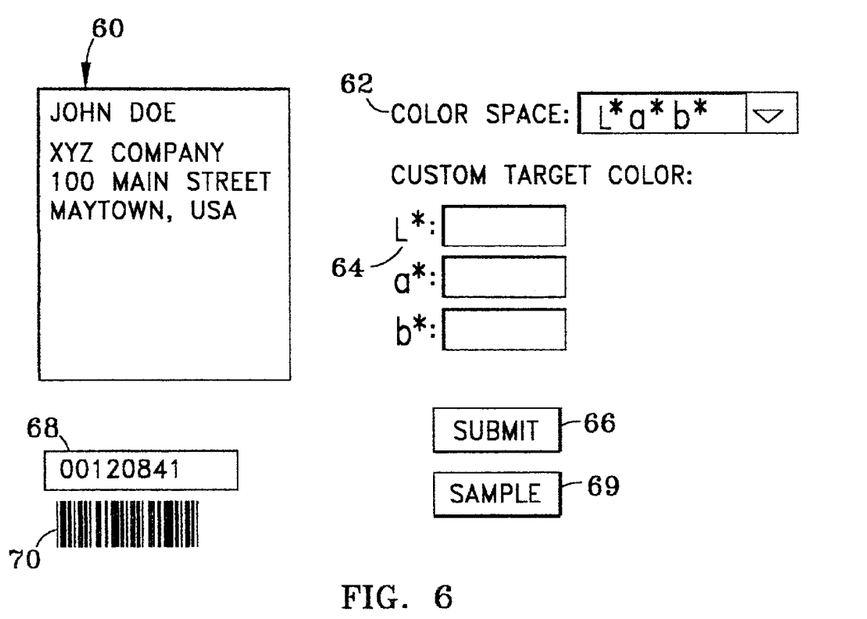
FIG. 6 shows one possible interface display on a potential purchaser's monitor for permitting the potential purchaser request a custom color.

If the potential purchaser cannot locate a satisfactory color in the database of available colors, the potential purchaser can order a custom color. FIG. 6 shows one possible custom color request form on a potential purchaser's color monitor for enabling the potential purchaser to request a custom color. As shown in FIG. 6, the potential purchaser's identification is automatically imported into a potential purchaser field 60. The potential purchaser then selects a color space through color space field 62 and specifies custom color target values at custom target color values field 64. The custom color target values define the color that the potential purchaser requests the vendor to reproduce. The potential purchaser submits the request for a custom color by selecting a submit icon 66. Upon receipt of the request for a custom color, the host computer system creates a record containing the information in fields 60, 62 and 64 and assigns a unique identifier to the request. This identifier is provided to the potential purchaser's computer as shown in FIG. 6 as identifier 68. To further enhance the accuracy of the custom color produced by the vendor, the potential purchaser may send a sample of a product having the custom color to the vendor. The potential purchaser indicates that a sample is being forwarded to the vendor by selecting a sample indicator 69. If the potential purchaser selects the sample indicator 69, the identifier 68 may also be presented as a machine readable identifier 70 (e.g., barcode) as shown in FIG. 6. The potential purchaser can print the screen shown in FIG. 6 and forward this print along with the sample of the product having the custom color to the vendor. Upon receipt, the vendor can machine read the machine readable identifier 70 to automatically associate the sample with the potential purchaser's custom color request.

Figure 7:
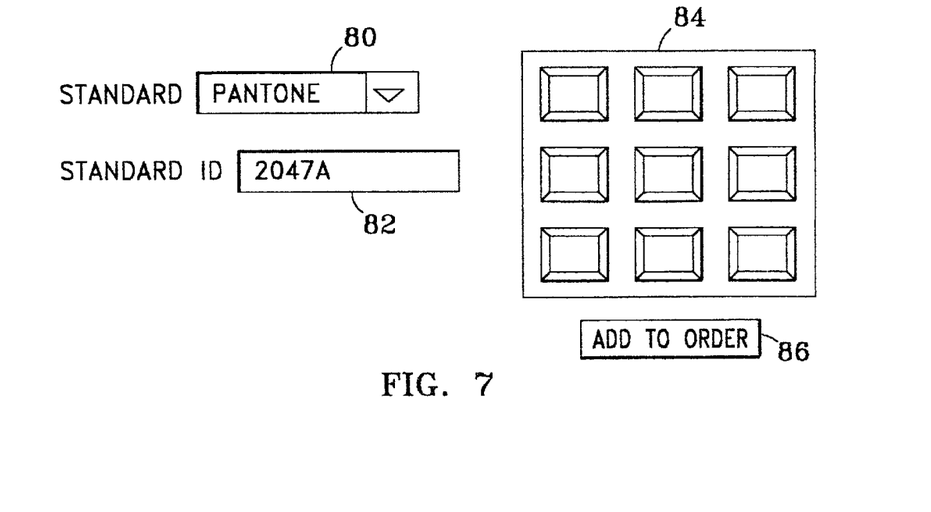
FIG. 7 shows one possible display on a potential purchaser's monitor for permitting the potential purchaser to specify a standard color.

In an alternate embodiment of the invention, the potential purchaser can enter a predefined target color using standard color specifications such as Pantone™ color identifiers. FIG. 7 shows one possible display on a potential purchaser's color monitor for permitting the potential purchaser to enter a standard color. As shown in FIG. 7, the potential purchaser can select a standard in standard field 80. The standard may be industry standards (e.g., Pantone™ standard) or standards for manufacturers other than the vendor (e.g., Compaq™ standard). The vendor can manage supply of color samples for third party manufacturers. The potential purchaser then enters a standard color identifier in a standard color identifier field 82. The host system 14 receives the standard and standard color identifier and accesses a database corresponding to the selected standard. Stored in the database are entries of n vendor colors indexed by the standard color identifier. The n vendor colors closest to the standard color can be predetermined based on the method described herein. The n vendor colors closest to the standard color are displayed in a virtual color table 84 in which the default background color is the standard color and the n closest available vendor colors are swatches or tiles overlying the background color. The potential purchaser can then order a sample of one or more available vendor colors through an add to order icon 86 as described above.

The program run by the host computer system 14 to provide the interface and process requests from the potential purchaser's computer is written in HTML and JAVA so that it is platform independent. Queries of the databases are done in SQL. Other programs run by the host computer system provide for system administration, maintenance and the uploading of color information into the color database. The color information that is to be uploaded can reside in an off-site color database that is accessible via the network.

As described above, the invention can be embodied in the form of computer-implemented processes and apparatuses for practicing those processes. The invention can also be embodied in the form of computer program code containing instructions embodied in tangible median, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method for allowing a potential purchaser to specify a custom color to a vendor, the method being implemented through a potential purchaser computer coupled to a vendor host computer system by a network, the method comprising:

receiving at the vendor host computer system a request to specify a custom color from the potential purchaser computer;

providing the potential purchaser computer with a custom color request form;

receiving at the vendor host computer system a custom color request specification from the potential purchaser computer, said custom color request specification being based on entries in said custom color request form, said vendor host computer system assigning a unique identifier to said custom color request specification;

presenting said unique identifier to said potential purchaser computer;

said presenting said unique identifier to said potential purchaser computer presents said unique identifier in machine readable form;

receiving at the vendor a physical sample of a product having the custom color from the potential purchaser;

said unique identifier in machine readable form being included along with said sample received by the vendor.

2. The method of claim 1 wherein:

said custom color request form includes a color space field for designating a color space for the custom color.

3. The method of claim 2 wherein:

said custom color request form includes a custom color target field for designating a point in said color space.

4. The method of claim 1 wherein said machine readable form is bar-code.

5. A system for allowing a potential purchaser to specify a custom color to a vendor, the system comprising:

a vendor host computer system for receiving a request for a custom color from a potential purchaser computer, said vendor host computer system coupled to said potential purchaser computer by a network;

said vendor host computer system providing said potential purchaser computer with a custom color request form;

said vendor host computer system receiving a custom color request specification from said potential purchaser computer, said custom color request specification being based on entries in said custom color request form said vendor host computer system assigns a unique identifier to said custom color request specification;

said vendor host computer system presents said unique identifier to said potential purchaser computer;

said presenting said unique identifier to said potential purchaser computer presents said unique identifier in machine readable form, said unique identifier in machine readable form being received by the vendor along with a physical sample of a product having the custom color.

6. The system of claim 5 wherein:

said custom color request form includes a color space field for designating a color space for the custom color.

7. The system of claim 6 wherein:

said custom color request form includes a custom color target field for designating a point in said color space.

8. The system of claim 5 wherein said machine readable form is bar-code.

9. A storage medium encoded with machine-readable computer program code for allowing a potential purchaser to specify a custom color to a vendor through a potential purchaser computer coupled to a vendor host computer system by a network, the storage medium including instructions for causing the vendor host computer system to implement a method comprising:

receiving at the vendor host computer system a request to specify a custom color from the potential purchaser computer;

providing the potential purchaser computer with a custom color request form;

receiving at the vendor host computer system a custom color request specification from the potential purchaser computer, said custom color request specification being based on entries in said custom color request form;

assigning a unique identifier to said custom color request specification;

presenting said unique identifier to said potential purchaser computer;

said presenting said unique identifier to said potential purchaser computer presents said unique identifier in machine readable form, said unique identifier in machine readable form being received by the vendor along with a physical sample of a product having the custom color.

10. The storage medium of claim 9 wherein said machine readable form is bar-code.

\* \* \* \* \*